(12) United States Patent
Rudzitis et al.

(10) Patent No.: US 10,909,250 B2
(45) Date of Patent: Feb. 2, 2021

(54) KEY MANAGEMENT AND HARDWARE SECURITY INTEGRATION

(71) Applicant: Amazon Technologies, Inc., Seattle, WA (US)

(72) Inventors: Aleksandrs J. Rudzitis, Seattle, WA (US); Sreekumar Mukundan Pisharody, Bothell, WA (US); John Kenneth Beer, Seattle, WA (US); Benjamin Tillman Farley, The Hague (NL)

(73) Assignee: Amazon Technologies, Inc., Seattle, WA (US)

( * ) Notice: Subject to any disclaimer, the term of this patent is extended or adjusted under 35 U.S.C. 154(b) by 219 days.

(21) Appl. No.: 15/969,695

(22) Filed: May 2, 2018

(65) Prior Publication Data

US 2019/0342079 A1   Nov. 7, 2019

(51) Int. Cl.
*G06F 21/60* (2013.01)
*G06F 21/72* (2013.01)
*H04L 9/08* (2006.01)

(52) U.S. Cl.
CPC ............ *G06F 21/602* (2013.01); *G06F 21/72* (2013.01); *H04L 9/083* (2013.01); *H04L 9/0897* (2013.01); *H04L 9/0841* (2013.01)

(58) Field of Classification Search
CPC .................................................. G06F 21/602
See application file for complete search history.

(56) References Cited

U.S. PATENT DOCUMENTS 9,053,480 B1 * 6/2015 Jenks ................... G06Q 20/401
9,584,325 B1 * 2/2017 Brandwine ........... H04L 9/3234
(Continued)

OTHER PUBLICATIONS

Baldwin, A. and Shiu, S., Oct. 2003,. Hardware encapsulation of security services. In European Symposium on Research in Computer Security (pp. 201-216). Springer, Berlin, Heidelberg. (Year: 2003).*

(Continued)

*Primary Examiner* — James R Turchen
(74) *Attorney, Agent, or Firm* — Davis Wright Tremaine LLP

(57) ABSTRACT

A network-based service for the management of cryptographic key, such as a key management service ("KMS"), provides a web service application programming interface ("API"). Cryptographic keys managed by the service may be stored in a one or more network-connected cryptographic devices such as network-connected hardware security modules ("HSM"). The key management service maintains metadata associated with the cryptographic keys. When a request is received by the key management service, the key management service uses an identifier provided with the request to identify metadata associated with a cryptographic key used to fulfill the request. The key management service uses the metadata to identify a cryptographic device containing the cryptographic key. The key management service generates a set of commands for fulfilling the request such that the commands are compatible with a protocol implemented by the identified cryptographic device, and the set of commands are sent to the identified cryptographic device.

20 Claims, 9 Drawing Sheets

(56) References Cited

U.S. PATENT DOCUMENTS

| | | | | |
|---|---|---|---|---|
| 9,887,836 | B1* | 2/2018 | Roth | H04L 9/0822 |
| 10,387,687 | B2* | 8/2019 | Boehl | G06F 11/3608 |
| 10,425,225 | B1* | 9/2019 | Grubin | H04L 9/0897 |
| 10,484,331 | B1* | 11/2019 | Rossman | H04L 63/1491 |
| 2007/0180228 | A1* | 8/2007 | Mattsson | H04L 9/0625 |
| | | | | 713/156 |
| 2008/0005359 | A1* | 1/2008 | Khosravi | H04L 63/06 |
| | | | | 709/250 |
| 2008/0022354 | A1* | 1/2008 | Grewal | H04W 12/0609 |
| | | | | 726/1 |
| 2012/0131354 | A1* | 5/2012 | French | H04L 9/3271 |
| | | | | 713/189 |
| 2014/0250491 | A1* | 9/2014 | Fleischman | G06F 12/1408 |
| | | | | 726/1 |
| 2014/0281483 | A1* | 9/2014 | Vigliaturo | H04L 63/0471 |
| | | | | 713/153 |
| 2014/0281487 | A1* | 9/2014 | Klausen | G06F 21/602 |
| | | | | 713/153 |
| 2014/0282936 | A1* | 9/2014 | Fitzgerald | H04L 63/0272 |
| | | | | 726/6 |
| 2015/0006890 | A1* | 1/2015 | Roth | G06F 21/6254 |
| | | | | 713/165 |
| 2015/0082041 | A1* | 3/2015 | Gaspar Cuevas | H04L 9/083 |
| | | | | 713/171 |
| 2015/0134953 | A1* | 5/2015 | Seaborn | G06F 21/602 |
| | | | | 713/168 |
| 2015/0358161 | A1* | 12/2015 | Kancharla | G06F 21/602 |
| | | | | 713/164 |
| 2015/0358312 | A1* | 12/2015 | Kancharla | H04L 63/0823 |
| | | | | 713/156 |
| 2017/0249464 | A1* | 8/2017 | Maximov | G06F 21/57 |
| 2017/0338949 | A1* | 11/2017 | Amiri | H04L 63/0428 |
| 2018/0004930 | A1* | 1/2018 | Csinger | H04L 9/3234 |
| 2018/0054303 | A1* | 2/2018 | O'Toole | G06F 21/6263 |
| 2018/0293406 | A1* | 10/2018 | Boehl | G06F 21/577 |
| 2018/0367311 | A1* | 12/2018 | Stahlberg | H04L 9/3247 |
| 2019/0132127 | A1* | 5/2019 | Birke | H04L 9/0877 |

OTHER PUBLICATIONS

Dang, Q., "Recommendation for Applications Using Approved Flash Algorithms," NIST Special Publication 800-107, Revision 1, U.S. Department of Commerce, Aug. 2012, 25 pages.

Atkinson, R., "Security Architecture for the Internet Protocol," Request for Comments: 1825, Standards Track, Aug. 1995, 23 pages.

Atkinson, R., "IP Authentication Header," Request for Comments: 1826, Standards Track, Aug. 1995, 14 pages.

Atkinson, R., "IP Encapsulating Security Payload (ESP)," Request for Comments: 1827, Standards Track, Aug. 1995, 13 pages.

Metzger, P., et al., "IP Authentication Using Keyed MD5," Request for Comments: 1828, Standards Track, Aug. 1995, 6 pages.

Karn, P., et al., "The ESP DES-CBC Transform," Request for Comments: 1829, Standards Track, Aug. 1995, 11 pages.

Dierks, T., et al., "The TLS Protocol Version 1.0," Request for Comments: 2246, Standards Track, Jan. 1999, 75 pages.

Kent, S., and R. Atkinson, "Security Architecture for the Internet Protocol," Request for Comments: 2401, Standards Track, Nov. 1998, 62 pages.

Orman, H., "The OAKLEY Key Determination Protocol," Request for Comments: 2412, Informational, Nov. 1998, 56 pages.

Newman, C., "Using TLS with IMAP, POP3 and ACAP," Request for Comments: 2595, Standards Track, Jun. 1999, 16 pages.

Medvinsky, A., et al., "Addition of Kerberos Cipher Suites to Transport Layer Security (TLS)," Request for Comments: 2712, Standards Track, Oct. 1999, 7 pages.

Khare, R., et al., "Upgrading to TLS Within HTTP/1.1," Request for Comments: 2817, Standards Track, May 2000, 13 pages.

Rescorla, E., "HTTP Over TLS," Request for Comments: 2818, Informational, May 2000, 8 pages.

Hoffman, P., "SMTP Service Extension for Secure SMTP over Transport Layer Security," Request for Comments: 3207, Standards Track, Feb. 2002, 9 pages.

Chown, P., "Advanced Encryption Standard (AES) Ciphersuites for Transport Layer Security (TLS)," Request for Comments: 3268, Standards Track, Jun. 2002, 8 pages.

Blake-Wilson, S., et al., "Transport Layer Security (TLS) Extensions," Request for Comments: 3546, Standards Track, Jun. 2003, 28 pages.

Hollenbeck, S., "Transport Layer Security Protocol Compression Methods," Request for Comments: 3749, Standards Track, May 2004, 8 pages.

Friend, R., "Transport Layer Security (TLS) Protocol Compression Using Lempel-Ziv-Stac (LZS)," Request for Comments: 3943, Informational, Nov. 2004, 13 pages.

Moriai, S., et al., "Addition of Camellia Cipher Suites to Transport Layer Security (TLS)," Request for Comments: 4132, Standards Track, Jul. 2005, 8 pages.

Lee, H.J., et al., "Addition of Seed Cipher Suites to Transport Layer Security (TLS)," Request for Comments: 4162, Standards Track, Aug. 2005, 7 pages.

Ford-Hutchinson, P., "Securing FTP with TLS," Request for Comments: 4217, Standards Track, Oct. 2005, 29 pages.

Lehtinen, S., et al., "The Secure Shell (SSH) Protocol Assigned Numbers," Request for Comments: 4250, Standards Track, Jan. 2006, 19 pages.

Ylonen, T., et al., "The Secure Shell (SSH) Protocol Architecture," Request for Comments: 4251, Standards Track, Jan. 2006, 28 pages.

Ylonen, T., et al., "The Secure Shell (SSH) Authentication Protocol," Request for Comments: 4252, Standards Track, Jan. 2006, 16 pages.

Ylonen, T., et al., "The Secure Shell (SSH) Transport Layer Protocol," Request for Comments: 4253, Standards Track, Jan. 2006, 30 pages.

Ylonen, T., et al., "The Secure Shell (SSH) Connection Protocol," Request for Comments: 4254, Standards Track, Jan. 2006, 23 pages.

Schlyter, J., et al., "Using DNS to Securely Publish Secure Shell (SSH) Key Fingerprints," Request for Comments: 4255, Standards Track, Jan. 2006, 9 pages.

Cusack, F., et al., "Generic Message Exchange Authentication for the Secure Shell Protocol (SSH)," Request for comments: 4256, Standards Track, Janary 2006, 12 pages.

Eronen, P., and H. Tschofenig, "Pre-Shared Key Ciphersuites for Transport Layer Security (TLS)," Request for Comments: 4279, Standards Track, Dec. 2005, 16 pages.

Kent, S., and K. Seo, "Security Architecture for the Internet Protocol," Request for Comments: 4301, Standards Track, Dec. 2005, 102 pages.

Kent, S., "IP Encapsulating Security Payload (ESP)," Request for Comments: 4303, Standards Track, Dec. 2005, 45 pages.

Housley, R., "Using Advanced Encryption Standard (AES) CCM Mode With IPsec Encapsulating Security Payload (ESP)," Request for Comments: 4309, Standards Track, Dec. 2005, 14 pages.

Galbraith, J., et al., "The Secure Shell (SSH) Session Channel Break Extension," Request for Comments: 4335, Standards Track, Jan. 2006, 6 pages.

Bellare, M., et al., "The Secure Shell (SSH) Transport Layer Encryption Modes," Request for Comments: 4344, Standards Track, Jan. 2006, 12 pages.

Harris, B., "Improved Arcfour Modes for the Secure Shell (SSH) Transport Layer Protocol," Request for Comments: 4345, Standards Track, Jan. 2006, 5 pages.

Rescorla, E., and N. Modadugu, "Datagram Transport Layer Security," Request for Comments: 4347, Standards Track, Apr. 2006, 26 pages.

Blake-Wilson, S., et al., "Transport Layer Security (TLS) Extensions," Request for Comments: 4366, Standards Track, Apr. 2006, 29 pages.

Friedl, M., et al., "Diffie-Hellman Group Exchange for the Secure Shell (SSH) Transport Layer Protocol," Request for Comments: 4419, Standards Track, Mar. 2006, 10 pages.

(56) References Cited

OTHER PUBLICATIONS

Harris, B., "RSA Key Exchange for the Secure Shell (SSH) Transport Layer Protocol," Request for Comments: 4432, Standards Track, Mar. 2006, 8 pages.

Hutzelman, J., et al., "Generic Security Service Application Program Interface (GSS-API) Authentication and Key Exchange for the Secure Shell (SSH) Protocol," Request for Comments 4462, Standards Track, May 2006, 28 pages.

Blake-Wilson, S., et al., "Elliptic Curve Cryptography (ECC) Cipher Suites for Transport Layer Security (TLS)," Request for Comments: 4492, Informational, May 2006, 36 pages.

Santesson, S., "TLS Handshake Message for Supplemental Data," Request for Comments: 4680, Standards Track, Sep. 2006, 10 pages.

Santesson, S., et al., "TLS User Mapping Extension," Request for Comments: 4681, Standards Track, Oct. 2006, 11 pages.

Galbraith, J., et al., "The Secure Shell (SSH) Public Key File Format," Request for Comments: 4716, Informational, Nov. 2006, 11 pages.

Blumenthal, U., and P. Goel, "Pre-Shared Key (PSK) Ciphersuites with NULL Encryption for Transport Layer Security (TLS)," Request for Comments: 4785, Standards Track, Jan. 2007, 6 pages.

Galbraith, J., et al., "Secure Shell Public Key Subsystem," Request for Comments: 4819, Standards Track, Mar. 2007, 18 pages.

Taylor, D., et al., "Using the Secure Remote Password (SRP) Protocol for TLS Authentication," Request for Comments: 5054, Informational, Nov. 2007, 25 pages.

Salowey, J., et al., "Transport Layer Security (TLS) Session Resumption without Server-Side State," Request for Comments: 5077, Standards Track, Jan. 2008, 21 pages.

Mavrogiannopoulos, N., "Using OpenPGP Keys for Transport Layer Security (TLS) Authentication," Request for Comments: 5081, Experimental, Nov. 2007, 9 pages.

Phelan, T., "Datagram Transport Layer Security (DTLS) over the Datagram Congestion Control Protocol (DCCP)," Request for Comments: 5238, Standards Track, May 2008, 11 pages.

Dierks, T., and E. Rescorla, "The Transport Layer Security (TLS) Protocol Version 1.2," Request for Comments: 5246, Standards Track, Aug. 2008, 98 pages.

Salowey, J., et al., "AES Galois Counter Mode (GCM) Cipher Suites for TLS," Request for Comments: 5288, Standards Track, Aug. 2008, 9 pages.

Rescorla, E., "TLS Elliptic Curve Cipher Suites with SHA-256/384 and AES Galois Counter Mode (GCM)," Request for Comments: 5289, Informational, Aug. 2008, 7 pages.

Igoe, K., and J. Solinas, "AES Galois Counter Mode for the Secure Shell Transport Layer Protocol," Request for Comments: 5647, Informational, Aug. 2009, 10 pages.

Stebila, D., and J. Green, "Elliptic Curve Algorithm Integration in the Secure Shell Transport Layer," Request for Comments: 5656, Standards Track, Dec. 2009, 19 pages.

Rescorla, E., et al., "Transport Layer Security (TLS) Renegotiation Indication Extension," Request for Comments: 5746, Standards Track, Feb. 2010, 16 pages.

McGrew, D., and E. Rescorla, "Datagram Transport Layer Security (DTLS) Extension to Establish Keys for the Secure Real-time Transport Protocol (SRTP)," Request for Comments: 5764, Standards Track, May 2010, 27 pages.

Brown, M., and R. Housley, "Transport Layer Security (TLS) Authorization Extensions," Request for Comments: 5878, Experimental, May 2010, 19 pages.

Kato, A., et al., "Camellia Cipher Suites for TLS," Request for Comments: 5932, Standards Track, Jun. 2010, 7 pages.

Eastlake, D., "Transport Layer Security (TLS) Extensions: Extension Definitions," Request for Comments: 6066, Standards Track, Jan. 2011, 25 pages.

Tuexen, M., et al., "Datagram Transport Layer Security (DTLS) for Stream Control Transmission Protocol (SCTP)," Request for Comments: 6083, Standards Track, Jan. 2011, 10 pages.

Mavrogiannopoulos, N., and D. Gillmor, "Using OpenPGP Keys for Transport Layer Security (TLS) Authentication," Request for Comments: 6091, Informational, Feb. 2011, 9 pages.

Turner, S., and T. Polk, "Prohibiting Secure Sockets Layer (SSL) Version 2.0," Request for Comments: 6176, Standards Track, Mar. 2011, 4 pages.

Igoe, K., "X.509v3 Certificated for Secure Shell Authentication," Request for Comments: 6187, Standards Track, Mar. 2011, 17 pages.

Kim, W., et al., "Addition of the ARIA Cipher Suites to Transport Layer Security (TLS)," Request for Comments: 6209, Informational, Apr. 2011, 10 pages.

Igoe, K., "Suite B Cryptographic Suites for Secure Shell (SSH)," Request for Comments: 6239, Informational, May 2011, 15 pages.

Rescorla, E., and N. Modadugu, "Datagram Transport Layer Security Version 1.2," Request for Comments: 6347, Standards Track, Jan. 2012, 33 pages.

Kanno, S., and M. Kanda, "Addition of the Camellia Cipher Suites to Transport Layer Security (TLS)," Request for Comments: 6367, Informational, Sep. 2011, 9 pages.

Salter, M., and R. Housley, "Suite B Profile for Transport Layer Security (TLS)," Request for Comments: 6460, Informational, Jan. 2012, 15 pages.

Sury, O., "Use of the SHA-256 Algorithm With RSA, Digital Signature Algorithm (DSA), and Elliptic Curve DSA (ECDSA) in SSHFP Resource Records," Request for Comments: 6594, Standards Track, Apr. 2012, 9 pages.

McGrew, D., and D. Bailey, "AES-CCM Cipher Suites for Transport Layer Security (TLS)," Request for Comments: 6655, Standards Track, Jul. 2012, 8 pages.

Bider, D., and M. Baushke, "SHA-2 Data Integrity Verification for the Secure Shell (SSH) Transport Layer Protocol," Request for Comments: 6668, Standards Track, Jul. 2012, 6 pages.

Merkle, J., and M. Lochter, "Elliptic Curve Cryptography (ECC) Brainpool Curves for Transport Layer Security (TLS)," Request for Comments: 7027, Informational, Oct. 2013, 11 pages.

Gutmann, P., "Encrypt-then-MAC for Transport Layer Security (TLS) and Datagram Transport Layer Security (DTLS)," Request for Comments: 7366, Standards Track, Sep. 2014, 7 pages.

International Search Report and Written Opinion, dated Jun. 13, 2019, International Patent Application No. PCT/US2019/028399, filed Apr. 19, 2019.

\* cited by examiner

KEY MANAGEMENT AND HARDWARE SECURITY INTEGRATION

BACKGROUND

Data security is an important aspect of a computing infrastructure. One way that data security is provided is through cryptography. In various environments, data may be encrypted or cryptographically signed to authenticate and protect the data. In general, when performing cryptographic operations, cryptographic keys are used. The ability of an entity to use a particular cryptographic key allows an entity to access plaintext data that is encrypted with the cryptographic key and to prove its ability to use the particular cryptographic key by way of a digital signature. Therefore, controlling access to cryptographic keys is an important problem on which service providers and others spend significant effort and resources to ensure the integrity of data.

BRIEF DESCRIPTION OF THE DRAWINGS

Various techniques will be described with reference to the drawings, in which.

DETAILED DESCRIPTION

Figure 1:
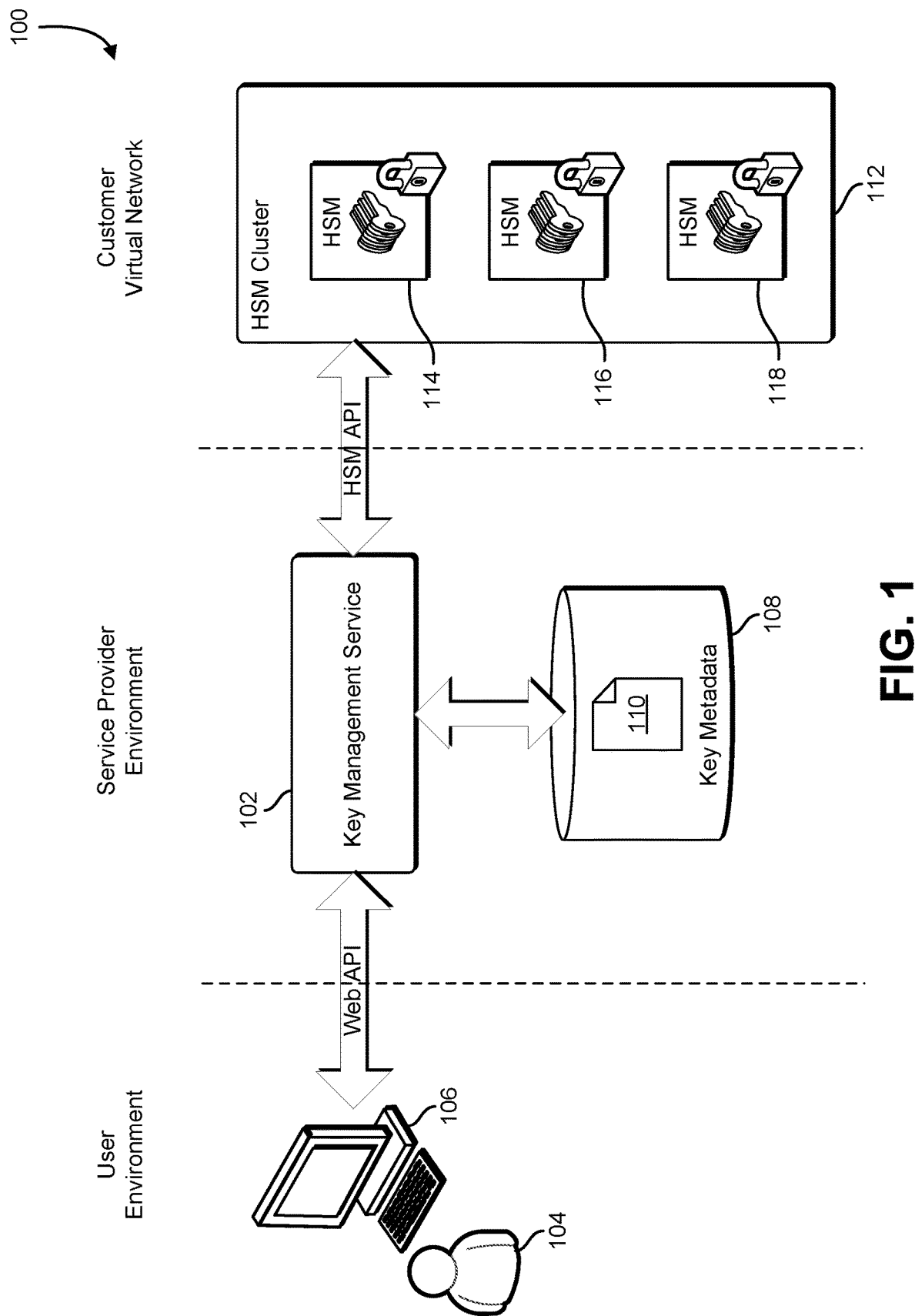
FIG. 1 illustrates an example of a system that manages cryptographic keys that are stored in a hardware security module, in an embodiment.

The present document describes a system that provides a network-based service for the management of cryptographic keys. In an embodiment, a key management service ("KMS") provides a web service application programming interface ("API") for the management of cryptographic keys. In an embodiment, cryptographic keys are stored in a one or more network-connected cryptographic devices such as network-connected hardware security modules ("HSM") containing tamper-resistant memory. In an embodiment, cryptographic keys stored within the cryptographic devices are non-exportable in that they may not be extracted from the cryptographic devices in a non-encrypted form. In an embodiment, the key management service maintains metadata describing the cryptographic keys managed by the service. In an embodiment, when a request is received by the key management service, the key management service uses an identifier provided with the request to identify metadata associated with a cryptographic key used to fulfill the request. In an embodiment, using the metadata, the key management service identifies a cryptographic device containing the cryptographic key. In an embodiment, the key management service generates a set of commands for fulfilling the request such that the commands are compatible with a protocol implemented by the identified cryptographic device. In an embodiment, the key management service translates the request submitted via the web service API into a public key cryptography standard ("PKCS")#11 compatible set of commands, which are then sent to the identified cryptographic device.

In an embodiment, the key management service allows for the management and use of cryptographic keys that are stored in cryptographic devices that are not controlled by the key management service. In an embodiment, a set of network-connected HSMs contain cryptographic keys belonging to a customer network. In an embodiment, the customer network may be a virtual private network ("VPN") or enterprise network operated by the customer. In an embodiment, cryptographic keys for the customer's enterprise are stored on the HSMs. In an embodiment, the key management service receives a request to perform a cryptographic operation from user in the customer enterprise, identifies a cryptographic device such as an HSM capable of fulfilling the request, and then fulfills the request by sending, to the cryptographic device, a set of commands compatible with the identified device. In various embodiments, the cryptographic devices may be connected to a virtual network controlled by the customer or a network controlled by the operator of the key management service.

In an embodiment, by separating the cryptographic devices from the key management service, the customer is provided with increased control over the cryptographic keys. In an embodiment, such control may include physical control over the cryptographic keys when the cryptographic devices are physically located within the customer enterprise. In an embodiment, the key management service allows the customer to use a variety of cryptographic devices including HSMs from different vendors and devices that implement different communication and command protocols. In an embodiment, the key management service maintains metadata that allows the key management service to generate appropriate commands for the cryptographic device on which the cryptographic key is located.

As one skilled in the art will appreciate in light of this disclosure, certain embodiments may be capable of achieving certain advantages, including some or all of the following: (1) Making it easier to use different HSMs by providing a standard web-based API that can manage keys stored in network-connected HSMs by way of a key management service, (2) providing security over the cryptographic keys by avoiding exporting an encrypted version of the key to the key management service, and (3) providing HSM security by allowing for the management and use of cryptographic keys stored in HSMs that are located in external networks, such as a customer datacenter or customer-controlled virtual network.

FIG. 1 illustrates an example of a system 100 that manages cryptographic keys that are stored in a hardware security module, in an embodiment. In an embodiment, a key management service 102 is a managed service that allows customers to create, delete, rotate, and use cryptographic keys on behalf of the customer. In an embodiment, the customer may request that an encrypted key be imported into an HSM and managed by the key management server. In an embodiment, the customer may request that a key stored in an HSM is to be imported into the key management server in encrypted form and managed. In an embodiment, using the key management service 102, customers are able to control how and when keys can be used by defining key management policies. In an embodiment, various services provided by a computing resource service provider may interact with the key management service to help protect data stored within those services. In an embodiment, the key management service is a computer system having one or more processors and a memory containing executable instructions that, as a result of being executed by the one or more processors, cause the computer system to perform various key management functions, such as key rotation, key generation, encryption, decryption, digital signature generation and verification, key deletion, and logging of key usage. In an embodiment, the computer system may be a computer server, virtual server, server cluster, container service, computing runtime, or instruction-processing apparatus.

In an embodiment, the key management service 102 is accessed by a user 104 via a client computer system 106. In an embodiment, the client computer system 106 is a personal computer system, a server computer system, a virtual computer system, handheld device, cellular phone, laptop computer, or computing appliance. The client computer system, in an embodiment, is hosted by a service provider that also runs the key management service 102. For instance, in an embodiment, the client computer system is a virtual computer system hosted on hardware of the service provider where the virtual computer system is remotely programmatically managed by a corresponding customer. In an embodiment, the client computer system 106 includes one or more processors and memory containing instructions that, as a result of being executed by the one or more processors, cause the client computer system to send requests and receive results from the key management service 102 via a computer network. In an embodiment, the requests submitted by the client computer system 106 are web service requests.

In an embodiment, the key management service 102 receives, from the client computer system 106, a request to perform a cryptographic operation. In an embodiment, the request includes information that allows the key management service 102 to identify a cryptographic key used to fulfill the request. In an embodiment, the information is a handle, name, or token or other identifier associated with the cryptographic key. In an embodiment, the identifier is indirectly identified by a parameter of the request. For example, in an embodiment, a request to encrypt data may specify a cryptographic key or cryptographic algorithm that may be used to identify a cryptographic device suitable for processing the request. In an embodiment, the key management service 102 identifies the cryptographic key associated with the information, and connects to a database 108 to retrieve a set of metadata 110 associated with the identified cryptographic key. In an embodiment, the database 108 may be a relational database, data store, data structure, key-value store, or memory that contains the metadata. The database 108 may be a memory in the computer system that hosts the key management service 102 or storage device external to the computer system that hosts the key management service 102 that is accessible via a computer network or external connection.

In an embodiment, the metadata 110 includes information usable by the key management service 102 to identify a cryptographic device on which the cryptographic key is stored. In an embodiment, the information includes one or more of a network address, a port number, a uniform resource locator ("URL"), and an identifier associated with the cryptographic device on which the cryptographic key is stored. In an embodiment, the cryptographic device is an HSM, a crypto processor, trusted platform module (TPM), tamper-resistant memory, a non-exportable memory device, or a protected memory. In an embodiment, the information describes an interface protocol associated with the cryptographic device on which the cryptographic key is stored. In an embodiment, the information describes credentials that are usable by the key management service 102 to access the cryptographic device. In an embodiment, the metadata includes information that specifies a key management policy for the cryptographic key such as the key rotation policy, a key length policy, and use restrictions for the cryptographic key. In an embodiment, the metadata includes an identifier, name, or handle that identifies the cryptographic key on the cryptographic device.

In an embodiment, the key management service 102 uses the metadata to determine whether the user 104 is allowed to use the cryptographic key associated with the requested cryptographic operation. In an embodiment, if the user 104 is allowed to use the cryptographic key, the key management service 102 translates the request into a set of commands that are compatible with the cryptographic device on which the cryptographic key is stored. In an embodiment, the request is submitted in the form of a web request, and the set of commands is a set of PKCS11 commands compatible with an HSM on which the cryptographic key is stored. In an embodiment, using address information extracted from the metadata and credentials, the key management service 102 submits the set of commands, and an identifier that identifies a cryptographic key on the cryptographic device, to the cryptographic device on which the cryptographic key is stored. In an embodiment, the cryptographic device performs cryptographic operations using the identified key, and returns the results to the key management service 102.

In an embodiment, the cryptographic device is a plurality of HSMs arranged as an HSM cluster 112. In an embodiment, an HSM cluster contains a set of cryptographic keys that are replicated across a plurality of HSMs. In an embodiment, a load balancer distributes requests to perform cryptographic operations across the plurality of HSMs allowing for increased throughput of cryptographic operations, and increased reliability in the event that an HSM fails. In an embodiment, the HSM cluster 112 includes a first HSM 114, a second HSM 116, and a third HSM 118. In an embodiment, the load balancer is a hardware load balancer that routes commands to individual HSMs in the cluster. In an embodiment, the load balancer is a software load balancer built into the key management server that selects an HSM based at least in part on the processing availability of individual HSMs in the cluster.

In an embodiment, cryptographic devices may be located remotely from the key management service to facilitate various network topologies or physical security requirements of the customer. In an embodiment, the cryptographic device is located on the same network as the key management service. In an embodiment, the cryptographic device is located within a customer data center, and the key management service accesses the cryptographic device by way of a tunnel or gateway that connects to a network in the customer data center. In an embodiment, the cryptographic device is connected to a customer virtual network, the key management service is hosted by a computing resource service provider, and the key management service configures the customer virtual network to allow the key management service to access the cryptographic device. By allowing the customer to maintain keys on cryptographic devices connected to networks under the control of the customer, customers are able to, in various embodiments, exert greater physical control over the cryptographic keys stored on those devices. In an embodiment, the cryptographic keys stored in the devices are not made available to the key management service in either the plaintext or encrypted form. In an embodiment, the key management service does not provide an encrypted version of the cryptographic key with the request to the HSM cluster.

Figure 2:
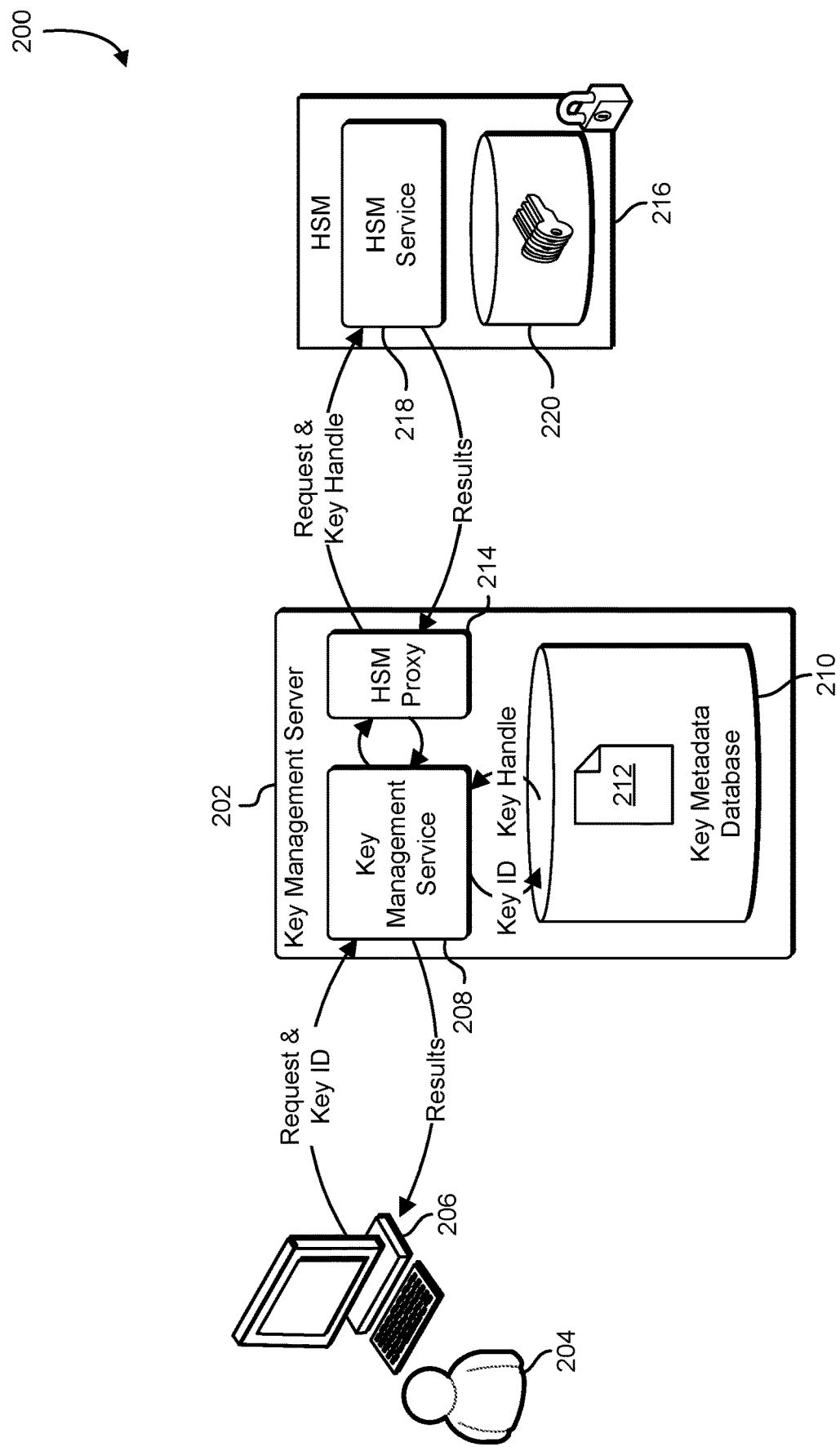
FIG. 2 illustrates an example of a key management server that manages keys stored in an HSM, in an embodiment.

FIG. 2 illustrates an example of a system 200 that includes a key management server that manages keys stored in an HSM, in an embodiment. In an embodiment, a key management server 202 provides key management services to a user 204 by providing a network-accessible application programming interface. In an embodiment, the key management server may be implemented on a computer system such as the web server described in FIG. 9. In an embodiment, the user 204 accesses the key management server 202 via a client computer system 206. In an embodiment, an application hosted on the client computer system 206 generates a request to perform a cryptographic operation. In an embodiment the request includes a key identifier. In an embodiment, the request is submitted to the key management server 202 via a web service interface such as a representational state transfer ("REST") interface, a simple object access protocol ("SOAP") interface, or an extensible markup language ("XML") interface.

In an embodiment, the request including the key identifier is received at a key management service 208 hosted by the key management server 202. In an embodiment, the key management service 208 is a software component comprised of executable instructions stored in a memory on the key management server 202. In an embodiment, in the present document, actions attributed to the key management service 208 are performed by the key management server 202 as a result of executing the executable instructions associated with the key management service 208. In an embodiment, the key management service 208 queries a database 210 in order to retrieve metadata 212 associated with the provided key identifier. In an embodiment, the metadata includes a key handle which, as a result of being provided to an HSM identified in the metadata 212, identifies a particular key on the HSM.

In an embodiment, the key management service 208 confirms that the user 204 is authorized to perform the operation requested, and submits the request along with the key handle to an HSM proxy 214 that is in communication with an HSM 216. In an embodiment, the HSM proxy 214 translates the request into a protocol that is compatible with the HSM 216. In an embodiment, the key management server includes a plurality of HSM proxies, and selects a particular proxy based at least in part on the key metadata 212. In an embodiment, the HSM proxy receives information from the key management service 208 that identifies a particular HSM, and identifies a network path to the particular HSM using information in the metadata 212. In an embodiment, the HSM 216 is connected to the same network as the key management server 202, and requests and results are simply transmitted between the HSM proxy 214 and the key management server 202 over the shared network.

In an embodiment, the HSM proxy 214 sends the translated request to an HSM service 218 on the HSM 216. In an embodiment, the HSM service 218 authenticates the key management server 202 is an authorized user as a prerequisite to fulfilling the request. In an embodiment, the HSM service 218 is a set of executable instructions running on a crypto processor of the HSM 216. In an embodiment, the HSM service 218 retrieves the key from protected memory 220 on the HSM 216 and performs the requested cryptographic operation. In an embodiment, the HSM service 218 returns the results to the HSM proxy 214, and the key management server 202 relays the results back to the client computer system 206.

Figure 3:
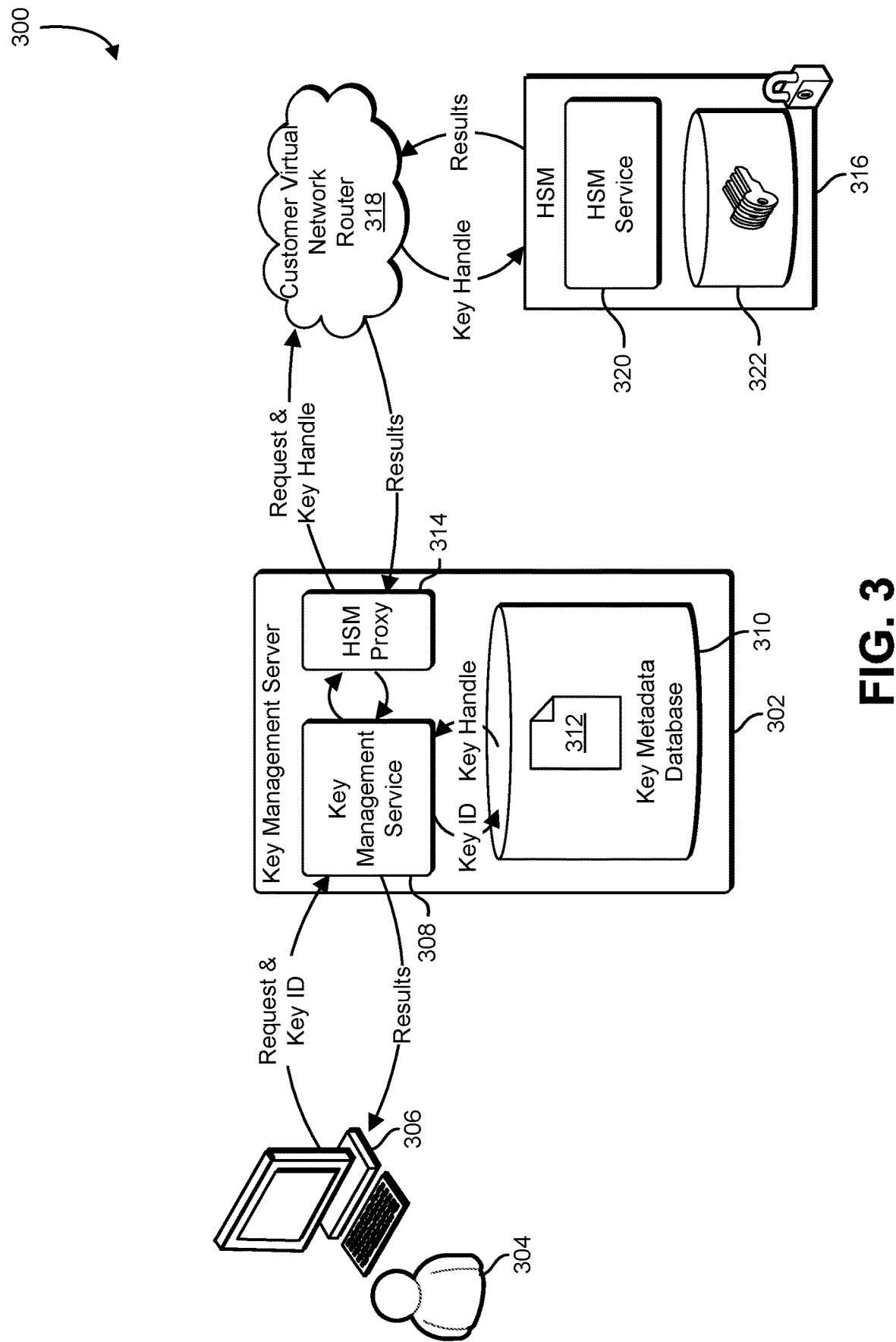
FIG. 3 illustrates an example of a key management server that communicates with an HSM via a router in the customer network, in an embodiment.

FIG. 3 illustrates an example of a key management system 300 that communicates with an HSM via a router in the customer network, in an embodiment. In an embodiment, a key management server 302 provides key management services to a user 304 by providing a network-accessible application programming interface. In an embodiment, the user 304 accesses the key management server 302 via a client computer system 306. In an embodiment, an application program hosted by the client computer system 306 generates a request to perform a cryptographic operation. In an embodiment the request includes a key identifier. In an embodiment, the request is submitted to the key management server 302 via a web service interface such as a representational state transfer ("REST") interface, or other web interface noted above.

In an embodiment, the request including the key identifier is received at a key management service 308 hosted by the key management server 302. In an embodiment, the key management service 308 is a software component comprised of executable instructions stored in a memory on the key management server 302. In an embodiment, in the present document, actions attributed to the key management service 308 are performed by the key management server 302 as a result of executing the executable instructions associated with the key management service 308. In an embodiment, the key management service 308 queries a database 310 in order to retrieve metadata 312 associated with the provided key identifier. In an embodiment, the metadata includes a key handle which, as a result of being provided to an HSM identified in the metadata 312, identifies a particular key on the HSM.

In an embodiment, the key management service 308 confirms that the user 304 is authorized to perform the operation requested, and submits the request along with the key handle to an HSM proxy 314 that is in communication with an HSM 316. In an embodiment, the HSM proxy 314 translates the request into a protocol that is compatible with the HSM 316. In an embodiment, the request is translated by generating a new command using a table of equivalent commands, and generating parameters for the new command in accordance with the syntax of the new protocol. In an embodiment, the translation may produce a plurality of commands that are equivalent to the original command. In an embodiment, the key management server includes a plurality of HSM proxies, and selects a particular proxy based at least in part on the key metadata 312. In an embodiment, the HSM proxy receives information from the key management service 308 that identifies a particular HSM, and identifies a network path to the particular HSM using information in the metadata 312.

In an embodiment, the HSM proxy 314 sends the translated request to an HSM service 320 on the HSM 316. In an embodiment, the HSM service 320 authenticates the key management server 302 is an authorized user as a prerequisite to fulfilling the request. In an embodiment, the HSM service 320 is a set of executable instructions running on a crypto processor of the HSM 316. In an embodiment, the HSM service 320 retrieves the key from protected memory 322 on the HSM 316 and performs the requested cryptographic operation. In an embodiment, the HSM service 320 returns the results to the HSM proxy 314, and the key management server 302 relays the results back to the client computer system 306.

In an embodiment, in order to provide additional security and control to the user, the HSM is located on the network different from that of the key management server 302. In an embodiment, the different network may be a different subnet, different virtual network, or different network segment. In an embodiment, the HSM 316 is connected to a network belonging to the customer such as a network and a customer data center or a virtual network controlled by the customer and not generally accessible to the key management server 302. In an embodiment, a virtual network router 318 is provided in the network of the HSM 316. In an embodiment, the virtual network router 318 provides an endpoint that is accessible to the key management server, and routes requests and results between the HSM 316 and the key management server 302. In an embodiment, the virtual network router 318 may be substituted for a physical network router, a gateway, or a network tunnel between the HSM 316 and the key management server 302.

Figure 4:
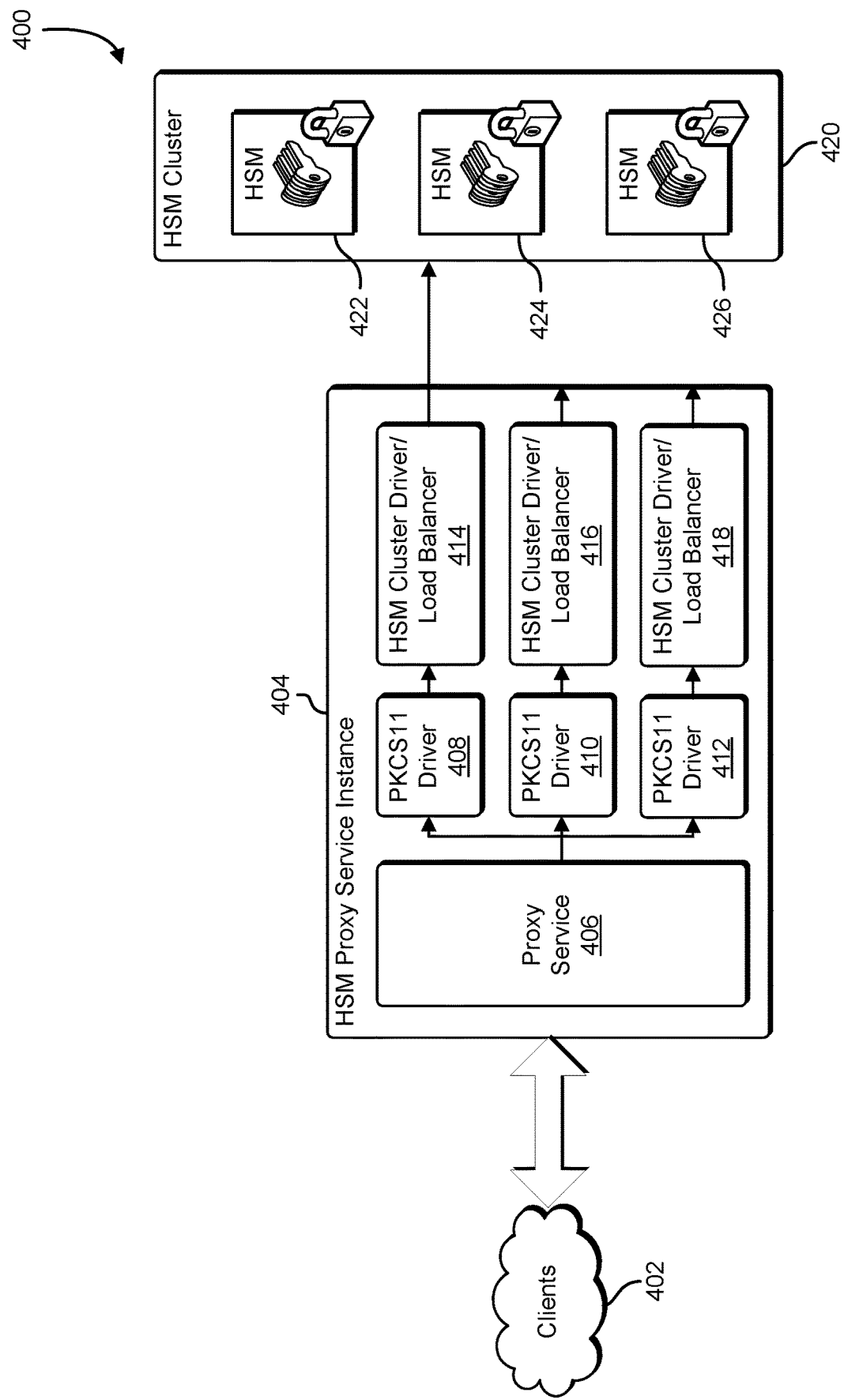
FIG. 4 illustrates an example of an HSM proxy service, in an embodiment.

FIG. 4 illustrates an architectural diagram 400 for an HSM proxy service, in an embodiment. In an embodiment, a set of clients 402 associated with the key management service is able to access an HSM proxy service instance 404. In an embodiment, the HSM proxy service instance 404 provides an application programming interface, web service interface, or service interface, that is accessible to the key management service. In an embodiment, the HSM proxy service instance 404 includes a proxy service 406 that interfaces to a set of drivers. In an embodiment, the set of drivers includes a first driver 408, a second driver 410, and a third driver 412. In an embodiment, each driver in the set of drivers provides an interface to the proxy service 406 that allows communication with a particular HSM cluster. In an embodiment, the interface provided by each driver in the set of drivers is a PKCS11, Microsoft cryptography API ("CAPI"), or JCE interface. In an embodiment, each driver in the set of drivers communicates with its associated HSM cluster via an HSM cluster driver/load balancer. In an embodiment, the HSM proxy service instance 404 includes a first cluster driver 414, a second cluster driver 416, and a third cluster driver 418. In an embodiment, each cluster driver translates the output from the set of drivers into a format and protocol that is compatible with the particular HSM cluster. In an embodiment, the cluster drivers communicate with their particular HSM clusters via a network interface. In an embodiment, the cluster drivers include a load-balancing function that distributes cryptographic requests across individual HSMs in the HSM cluster.

In an embodiment, the first cluster driver 414 distributes cryptographic commands across the set of HSMs organized in an HSM cluster 420. In an embodiment, cryptographic commands may be distributed in a round robin scheme, or in a random scheme. In an embodiment, the HSM cluster 420 includes a first HSM 422, a second HSM 424, and a third HSM 426. In an embodiment, a particular cluster driver may interface with an individual HSM, an HSM cluster, a crypto processor, or cryptographic device. In an embodiment, the cluster driver implements a protocol that is specific to the HSM vendor. In an embodiment, the HSM proxy service instance 404 may include a variety of drivers and cluster drivers that in combination are able to translate commands from a standard format produced by a key management service into a vendor-specific format and protocol understood by the HSMs. In an embodiment, this provides increased flexibility when implementing the key management system.

In an embodiment, the HSM proxy is implemented as a Java service, Go service, or a Python Service. In an embodiment, each HSM proxy service instance maintains information that includes address information for its associated HSM clusters. In an embodiment, the information includes a public key for the HSM cluster.

Figure 5:
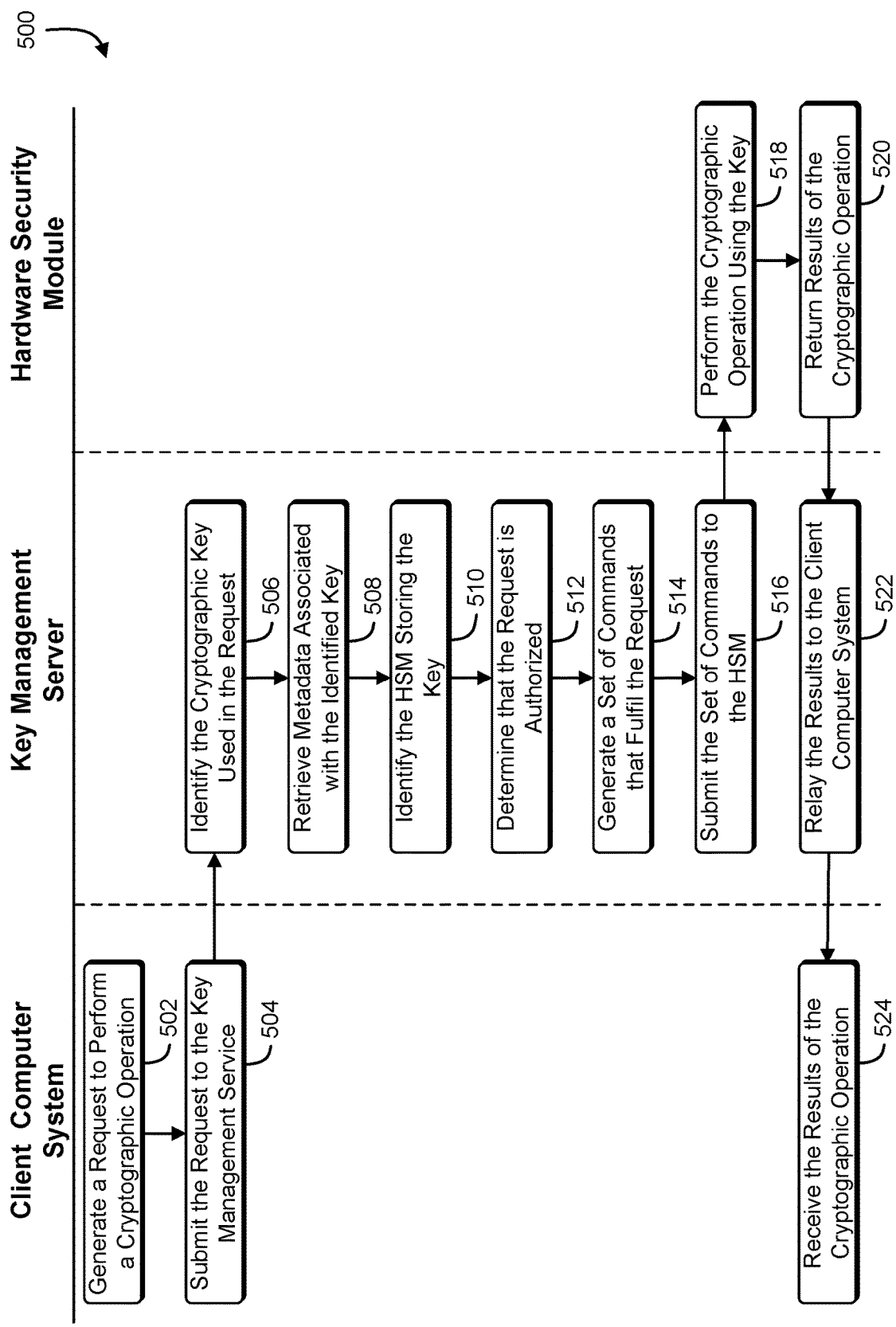
FIG. 5 illustrates an example of a process that, as a result of being performed by a client computer system, a key management server, and a hardware security module, performs a cryptographic operation using a cryptographic key stored on the HSM, in an embodiment.

FIG. 5 illustrates an example of a process 500 that, as a result of being performed by a client computer system, a key management server, and a hardware security module, performs a cryptographic operation using a cryptographic key stored on the HSM, in an embodiment. In an embodiment, the process begins at block 502 with a client computer system generating a request to perform a cryptographic operation. In an embodiment, the request may be a request to encrypt plaintext data, a request to decrypt ciphertext, a request to generate a digital signature, a request to rotate a cryptographic key, a request to generate a message authentication code, a request to verify a digital signature, or other operation. In an embodiment, the request includes information that identifies a particular cryptographic key. In an embodiment, the information is an identifier, handle, or token, but does not contain the cryptographic key itself in either an encrypted or plaintext form. In an embodiment, the information is an identifier associated with the cryptographic key that allows a key management service to identify the particular cryptographic key needed to perform the requested operation. In an embodiment, at block 504, the client computer system transmits the request and the identifying information associated with the cryptographic key to the key management server.

In an embodiment, at block 506, the key management server receives the request and uses the information provided in the request to identify the cryptographic key. In an embodiment, at block 508, the key management server accesses a data store and retrieves metadata associated with the cryptographic key. In an embodiment, the metadata may include information that identifies a set of cryptographic devices, such as HSMs, that contain the cryptographic key. In an embodiment, the metadata includes network address information, service URLs, port numbers, or other information that allows the key management server to access the hardware security module on which the cryptographic keys are stored. In an embodiment, the metadata includes credentials used to access the cryptographic device on which the cryptographic key is stored. In an embodiment, the metadata includes a handle, token, or associated identifier that identifies the cryptographic key to the cryptographic device.

In an embodiment, at block 510, the key management server uses the metadata to identify the particular HSM storing the cryptographic key. In an embodiment, at block 512, the key management server examines the request and determines whether the requester is authorized to perform the requested cryptographic operation. In an embodiment, the key management server may also examine the credentials in the metadata to determine whether the credentials allow the request to be submitted to the cryptographic device. In an embodiment, if the request is not authorized by either the key management server or the hardware security module, an error message is returned to the client computer system. In an embodiment, if the request is authorized by the key management server and the hardware security module, execution advances to block 514.

In an embodiment, at block 514, the key management server selects a particular HSM from the set of HSMs that contain the cryptographic key. In an embodiment, the metadata identifies a plurality of HSMs on which the cryptographic key is stored, and the key management server selects one of the pluralities of HSMs to fulfill the request using a load balancer. In an embodiment, the particular HSM is selected based at least in part on the metadata associated with the cryptographic key. In an embodiment, the key management server generates a set of commands that are compatible with the selected HSM. In an embodiment, at block 516, the set of commands and the key identifier determined from the metadata is submitted to the selected HSM. In an embodiment, the key management server provides credentials to the HSM to authorize the performance of the set of commands.

In an embodiment, at block 518, the HSM receives the set of commands. In an embodiment, the HSM retrieves the cryptographic key that is associated with the provided identifier and performs the set of commands to fulfill the request. In an embodiment, at block 520, the hardware security module generates a set of results from the cryptographic operation. In an embodiment, the operation is an encrypting operation and the results are a ciphertext produced from a plaintext provided with a set of commands. In an embodiment, the operation is a decrypting operation and the results are a plaintext produced from a ciphertext provided with a set of commands.

In an embodiment, at block 522, the key management server receives the results from the HSM and relays the results to the client computer system. In an embodiment, at block 524, the client computer system receives the results from the key management server, fulfilling the request submitted at block 502.

Figure 6:
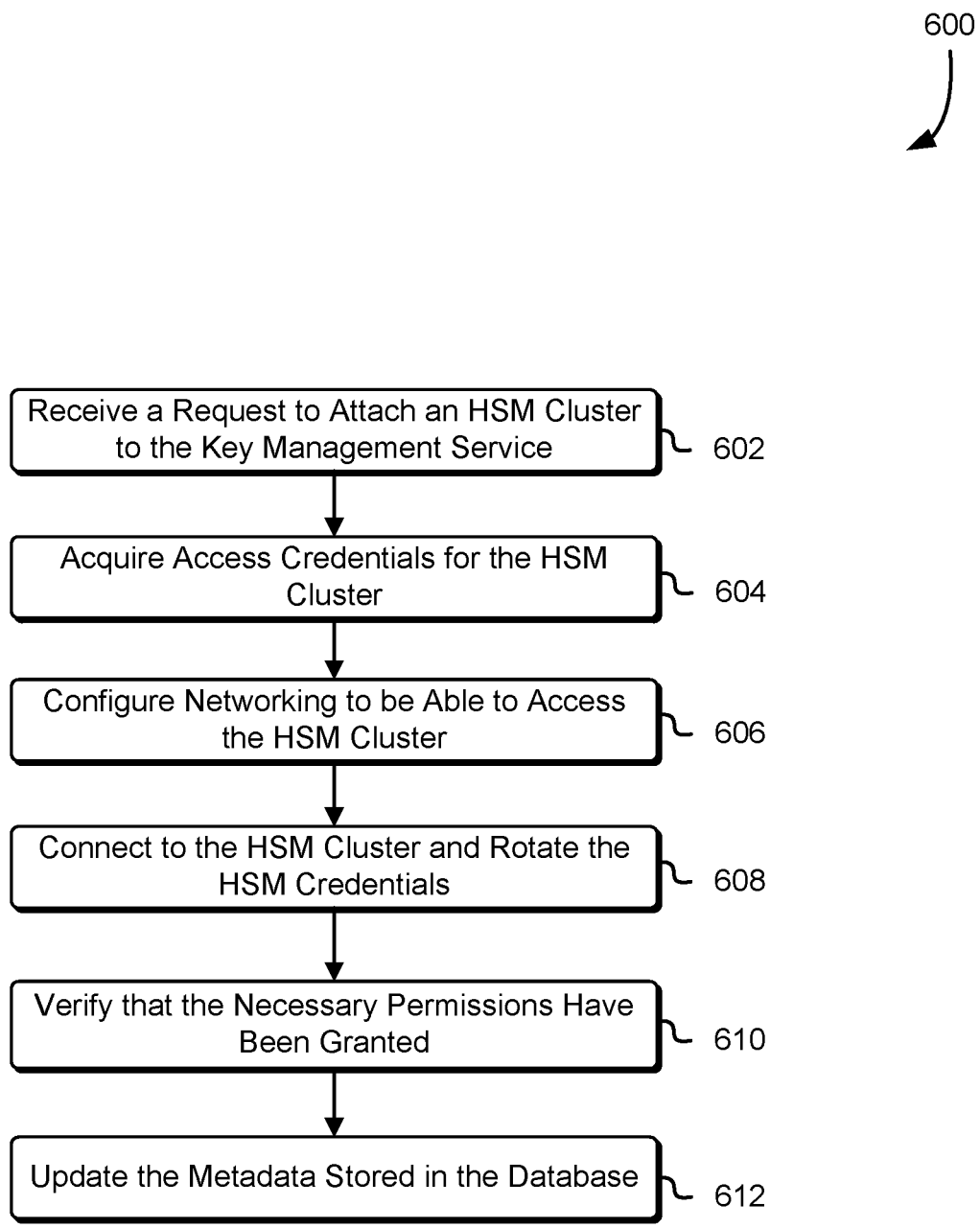
FIG. 6 illustrates an example of a process that, as a result of being performed by a key management server, establishes a logical attachment to an HSM cluster, in an embodiment.

FIG. 6 illustrates an example of a process 600 that, as a result of being performed by a key management server, establishes a logical attachment to an HSM cluster, in an embodiment. In an embodiment, the logical attachment to an HSM cluster establishes the capability of the key management server to communicate with the HSM cluster, and causes the HSM to perform cryptographic operations using a cryptographic key stored on the HSM cluster. In an embodiment, the logical attachment establishes a logical network connection, such as a TCP connection, between the key management server and the HSM, and confirms the authorization of the key management server to perform cryptographic operations on the HSM.

In an embodiment, the process begins at block 602 with the key management server receiving a request to attach an HSM cluster. In an embodiment, the request is a call to a network accessible API such as a Web request. In an embodiment, the request may specify a particular HSM, a crypto processor, or cryptographic device to attach to the key management server. In an embodiment, at block 604, the key management server acquires access credentials for the HSM cluster. In an embodiment, the key management server retrieves the access credentials from a database of access credentials maintained by the key management server. In an embodiment, the credentials to access the HSM cluster are included with the request to attach the cluster. In an embodiment, the credentials are a cryptographic key, private cryptographic key, username and password, or signed token.

In an embodiment, at block 606, the key management server configures a network route so that the key management server can access the HSM cluster. In an embodiment, the network route may be configured by configuring the virtual router (by adding one or more entries to a routing table, for example) to allow access to a customer virtual network. In an embodiment, at block 608, the key management server connects to the HSM cluster using a set of credentials provided with the attachment request. In an embodiment, after the key management server is authorized by the HSM cluster, at block 610, the key management server verifies the necessary permissions have been granted by the HSM. In an embodiment, the key management server rotates the credentials to a new set of credentials known only by the key management server. In an embodiment, credentials are rotated by generating a new set of credentials and authorizing the change with the HSM using the existing credentials. In an embodiment, at block 612, the updated credentials and the network address and routing information are stored in a database for later use by the key management server. In an embodiment, the key management server rotates the set of credentials to an additional new set of credentials on a periodic basis.

Figure 7:
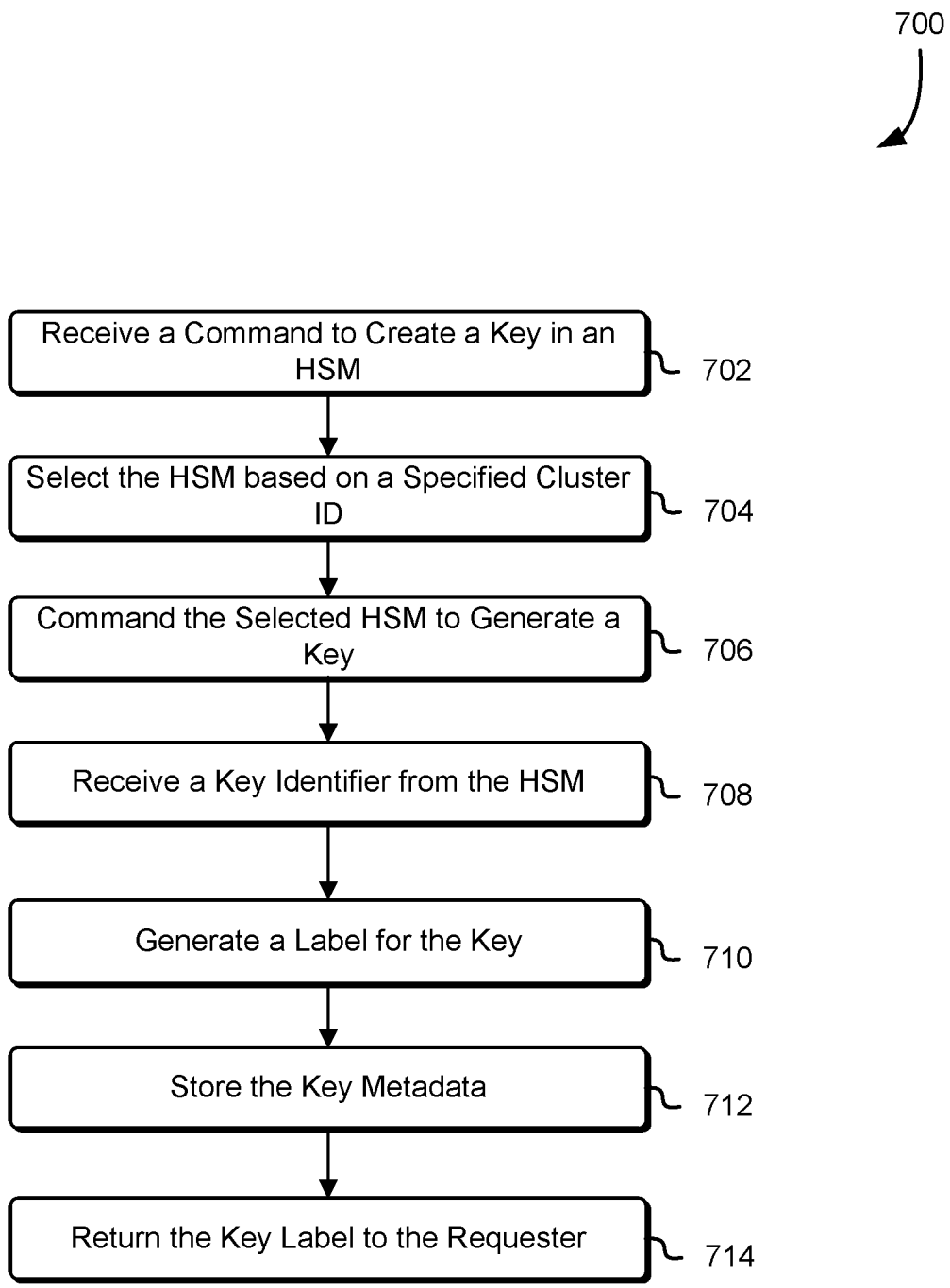
FIG. 7 illustrates an example of a process that, as a result of being performed by a key management server, generates a cryptographic key on an HSM and registers the key for use by a key management service, in an embodiment.

FIG. 7 illustrates an example of a process 700 that, as a result of being performed by a key management server, generates a cryptographic key on an HSM and registers the key for use by a key management service, in an embodiment. In an embodiment, at block 702, the key management server receives a command to create a key and HSM that is accessible to the key management server. In an embodiment, the command specifies an HSM, cryptographic device, or HSM cluster on which to create the cryptographic key by providing an identifier. In an embodiment, at block 704, the key management server identifies the HSM selected based at least in part on the identifier, and retrieves metadata that includes a network address and credentials for accessing the HSM. In an embodiment, at block 706, the key management server uses the network address and credentials to send a command to the HSM to generate a new cryptographic key. In an embodiment, the cryptographic key may be a symmetric or an asymmetric cryptographic key pair.

In an embodiment, at block 708, the HSM returns a key identifier to the key management server for use in referencing the cryptographic key. In an embodiment, at block 710, the key management server generates a label for the cryptographic key, and at block 712, the key identifier and the label are stored as metadata in a data store accessible to the key management server. In an embodiment, at block 714, the key label is returned to the requester. In an embodiment, the requester, or other entity, may perform cryptographic operations using the cryptographic key by identifying the cryptographic key with the label to the key management service.

Figure 8:
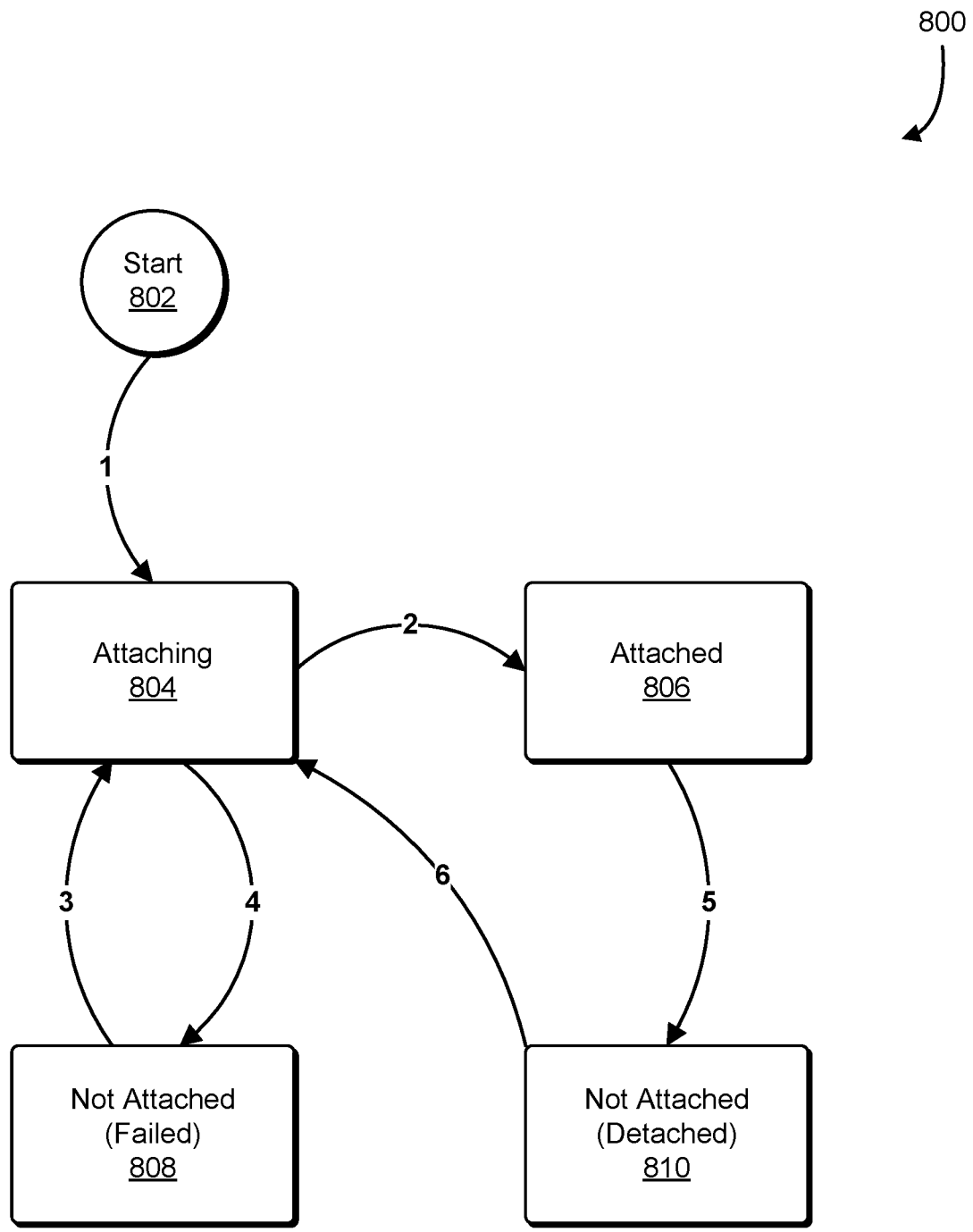
FIG. 8 illustrates an example of a set of allowable state transitions for an HSM connected to a key management service, in an embodiment.

FIG. 8 illustrates an example of a state transition diagram 800 for an HSM connected to a key management system, in an embodiment. In an embodiment, HSMs, HSM clusters, or cryptographic devices begin in a start state 802. In an embodiment, when a new HSM is added to the system, and the key management system begins the attachment process, the HSM is placed in an attaching state 804 as the process of connecting to the HSM operates. In an embodiment, if the attachment process is successful, the HSM is placed in an attached state 806. In an embodiment, an HSM and the attached state 806 has established a communication link with the key management system and may be used to generate and use cryptographic keys.

If the attachment process fails, the HSM is placed in a failed attachment state 808. In an embodiment, the failed attachment state 808 indicates that an attachment was attempted but did not successfully complete. In an embodiment, the key management system may attempt to reattach the HSM. In an embodiment, if such an attempt is made, the HSM returns to the attaching state 804.

In an embodiment, the key management system may detach a previously attached HSM, and the HSM is placed in a detached state 810. If the key management system determines that the HSM is to be reattached, the HSM returns to the attaching state 804.

Figure 9:
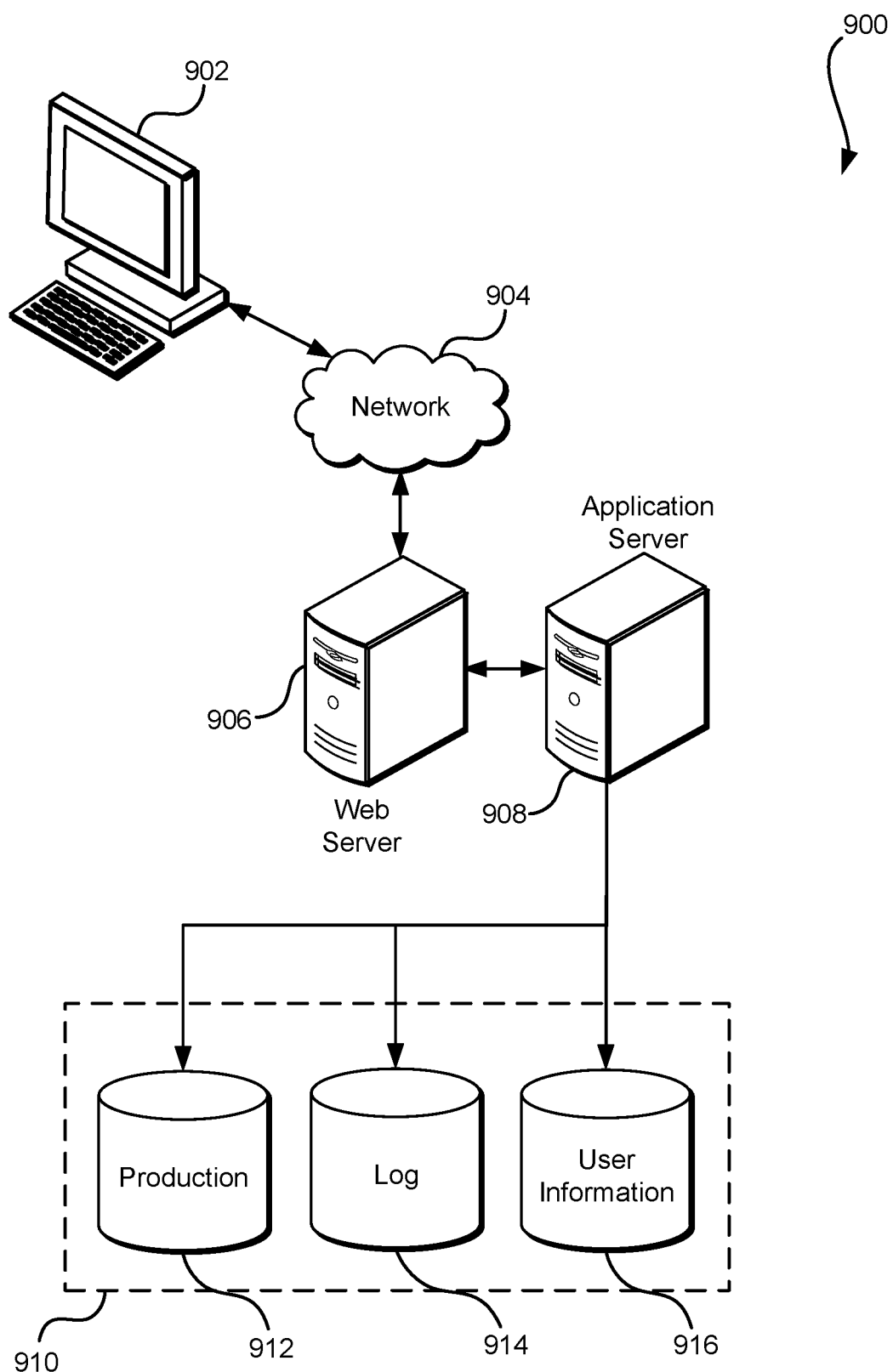
FIG. 9 illustrates a system in which various embodiments can be implemented.

FIG. 9 illustrates aspects of an example system 900 for implementing aspects of a key management server in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto and the application server 908 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle °, Microsoft °, Sybase °, and IBM as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Example, cryptographic algorithms include block ciphers and the various modes that utilize initialization vectors, such as the cipher-block chaining (CBC) mode, propagating cipher-block chaining (PCBC) mode, cipher feedback mode (CFB), output feedback (OFB) mode, counter (CTR) mode, and other modes, such as authenticated encryption modes such as eXtended Ciphertext Block Chaining (XCBC) mode, Integrity Aware CBC (IACBC) mode, Integrity Aware Parallelizable (IAPM) mode, Offset Codebook (OCB) mode, EAX and EAX Prime modes, Carter-Wegman+CTR (CWC) mode, Counter with CBC-MAC (CCM) mode, Galois/Counter (GCM) mode.

As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CASTS, RC4 and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

It should be noted that the phrase "one-way function" includes functions that are not necessarily one-way in the strict mathematical sense, but that exhibit properties (such as collision resistance, preimage resistance and second preimage resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (with the password being based at least in part on the plaintext and the cryptographic key, e.g.) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that $f(x)=y$ is below a specified threshold), second preimage resistance (given an input x1, the probably of randomly generating another input x2, different from x1, such that $f(x1)=f(x2)$ is below a specified threshold) and/or collision resistance (the probability of two different inputs resulting in the same output is less than a specified threshold). The exact threshold for each probability may be context-dependent, with lower probabilities corresponding to higher security contexts. A value can be cryptographically derived using a one-way function. An encryption function can be (or can be a component of) a one-way function from the perspective of an entity that lacks information (e.g., cryptographic key and/or salt) used as input into the encryption function. Hash functions usable as one-way functions in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference. The phrase cryptographically derived means using a one way function at least once using inputs that are the values or derived from the values (possibly cryptographically derived from the values). For example, an encryption operation is one-way to entities that do not have the decryption key.

Information may be said to be programmatically unexportable if there is no legitimate way to programmatically cause (e.g., through an interface of the device) the device to provide the information). The information may be maintained, for example, such that there is no request mechanism (e.g., application programming interface (API) call) for causing hardware, with access to the information in plaintext form, to reveal the information in plaintext form. As an example, a device storing the information (e.g., cryptographic module) may be configured to lack an ability to provide a copy of some or all of its memory such that the copy includes the information in plaintext form. It should be noted however, that while information for which there is no legitimate way of obtaining the information in plaintext form is used throughout the disclosure for the purpose of illustration, some information may be maintained such that the information is obtainable through a limited number of authorized uses, which may require various security protocols to be employed and able to prevent unauthorized access to the information in plaintext form. Generally, programmatically unexportable information is information (e.g., one or more cryptographic keys) for which extraordinary measures must be taken to obtain the information in plaintext form, if it is possible at all to obtain the information in plaintext form.

Note also that the examples used herein may be performed in compliance with one or more of: Request for Comments (RFC) 4250, RFC 4251, RFC 4252, RFC 4253, RFC 4254, RFC 4255, RFC 4256, RFC 4335, RFC 4344, RFC 4345, RFC 4419, RFC 4432, RFC 4462, RFC 4716, RFC 4819, RFC 5647, RFC 5656, RFC 6187, RFC 6239, RFC 6594, and RFC 6668, which are incorporated by reference.

Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366 which are incorporated herein by reference, to establish encrypted communications sessions. Other protocols implemented below the application layer of the Open Systems Interconnect (OSI) model may also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, Internet Protocol Security (e.g., as defined in RFC 1825 through 1829, RFC 2401, RFC 2412, RFC 4301, RFC 4309, and RFC 4303) and other protocols, such as protocols for secure communication that include a handshake.

Note that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

In various embodiments, data objects such as digital signatures may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining a request to use a cryptographic key to perform a cryptographic operation;
   obtaining metadata associated with the cryptographic key;
   using an identifier indicated by the request to select, from a set of hardware security modules, a hardware security module capable of performing the cryptographic operation, the hardware security module selected as a result of supporting a capability identified using the metadata; and
   causing the selected hardware security module to perform the cryptographic operation.

2. The computer-implemented method of claim 1, further comprising:
   identifying the cryptographic key usable to perform the cryptographic operation;
   identifying the hardware security module based at least in part on a characteristic of the cryptographic key.

3. The computer-implemented method of claim 1, further comprising:
   providing at least part of the metadata to the hardware security module.

4. The computer-implemented method of claim 1, further comprising:
   obtaining a result of the cryptographic operation from the selected hardware security module; and
   providing the result of the cryptographic operation to the requester.

5. A computer system, comprising one or more processors and memory storing executable instructions that, as a result of being executed by the one or more processors cause the computer system to:
   obtain a request to use a cryptographic key to perform a cryptographic operation;
   obtain metadata associated with the cryptographic key
   use an identifier specified in the request to select one or more cryptographic devices based on a capability of the one or more cryptographic devices, the capability determined using the metadata associated with the cryptographic key; and
   cause the one or more cryptographic devices to perform the cryptographic operation.

6. The system of claim 5, wherein:
   the computer system provides a web-based application programming interface; and
   the request is obtained via the web-based application programming interface.

7. The system of claim 5, wherein:
   the identifier identifies the cryptographic key; and
   the executable instructions further cause the computer system to select the one or more cryptographic devices from a set of cryptographic devices that are able to use the cryptographic key.

8. The system of claim 5, wherein the executable instructions further cause the computer system to:
   generate a set of commands in accordance with a platform-independent application programming interface to cryptographic tokens; and
   transmit the set of commands to the one or more cryptographic devices.

9. The system of claim 8, wherein:
   the one or more cryptographic devices are hardware security modules; and
   the platform-independent application programming interface to cryptographic tokens is a PKCS11 compliant application programming interface.

10. The system of claim 5, wherein:
    the request is obtained from a computer system on a network; and
    the one or more cryptographic devices are located on the network.

11. The system of claim 5, wherein the executable instructions further cause the computer system to:
    acquire an encrypted key that is associated with the identifier; and
    provide the encrypted key to the one or more cryptographic devices.

12. The system of claim 5, wherein the cryptographic device includes:
    a cryptoprocessor; and
    a memory storing a non-exportable cryptographic key used to perform the cryptographic operation.

13. A non-transitory computer-readable storage medium storing thereon executable instructions that, as a result of being executed by one or more processors of a computer system, cause the computer system to at least:
    obtain a request to use a cryptographic key to perform a cryptographic operation;
    obtain metadata associated with the cryptographic key;
    use an identifier specified in the request to select one or more cryptographic devices based at least in part on a capability, the capability identified based at least in part on the metadata associated with the cryptographic key; and
    cause the one or more cryptographic devices to perform the cryptographic operation.

14. The non-transitory computer-readable storage medium of claim 13, wherein the instructions further comprise instructions that, as a result of being executed by the one or more processors, cause the computer system to:
    generate a set of commands in accordance with a platform-independent application programming interface to cryptographic tokens; and
    transmit the set of commands to the one or more cryptographic devices.

15. The non-transitory computer-readable storage medium of claim 14, wherein:
    the one or more cryptographic devices are hardware security modules; and
    the platform-independent application programming interface to cryptographic tokens is a Java Cryptography Extension compliant application programming interface.

16. The non-transitory computer-readable storage medium of claim 13, wherein:
    the request is obtained from a computer system on a customer network; and
    the one or more cryptographic devices are located on the customer network.

17. The non-transitory computer-readable storage medium of claim 13, wherein the instructions further comprise instructions that, as a result of being executed by the one or more processors, cause the computer system to:
    acquire metadata for the cryptographic key that is associated with the identifier; and
    provide at least a portion of the metadata to the one or more cryptographic devices.

18. The non-transitory computer-readable storage medium of claim 13, wherein the one or more cryptographic devices include a tamper-resistant memory storing a cryptographic key usable to perform the request.

19. The non-transitory computer-readable storage medium of claim 13, wherein the executable instructions further cause the computer system to select the one or more cryptographic devices from a set of cryptographic devices based at least in part on the identifier.

20. The non-transitory computer-readable storage medium of claim 13, wherein the instructions further comprise instructions that, as a result of being executed by the one or more processors, cause the computer system to obtain the request via a network-accessible web service interface.

* * * * *